US009540266B2

(12) United States Patent
Reid (10) Patent No.: US 9,540,266 B2
(45) Date of Patent: Jan. 10, 2017

(54) MOVING BED MEDIA FLOW EQUALIZATION REACTOR

(71) Applicant: John H. Reid, Fredericksburg, VA (US)

(72) Inventor: John H. Reid, Fredericksburg, VA (US)

( * ) Notice: Subject to any disclaimer, the term of this patent is extended or adjusted under 35 U.S.C. 154(b) by 167 days.

(21) Appl. No.: 14/489,084

(22) Filed: Sep. 17, 2014

(65) Prior Publication Data

US 2016/0075577 A1     Mar. 17, 2016

(51) Int. Cl.
*C02F 3/08* (2006.01)
*C02F 3/30* (2006.01)
*C02F 3/12* (2006.01)
C02F 103/02 (2006.01)
C02F 101/32 (2006.01)
C02F 101/10 (2006.01)
C02F 101/16 (2006.01)
C02F 3/00 (2006.01)
C02F 1/24 (2006.01)
(Continued)

(52) U.S. Cl.
CPC .............. *C02F 3/085* (2013.01); *C02F 3/302* (2013.01); C02F 1/24 (2013.01); C02F 1/52 (2013.01); C02F 3/1268 (2013.01); C02F 3/2806 (2013.01); C02F 3/307 (2013.01); C02F 2003/001 (2013.01); C02F 2101/10 (2013.01); C02F 2101/105 (2013.01); C02F 2101/16 (2013.01); C02F 2101/163 (2013.01); C02F 2101/166 (2013.01); C02F 2101/32 (2013.01); C02F 2103/02 (2013.01); C02F 2203/00 (2013.01); C02F 2203/002 (2013.01); C02F 2209/40 (2013.01); Y02W 10/15 (2015.05)

(58) Field of Classification Search
CPC ....... C02F 3/085; C02F 3/302; C02F 2103/02; C02F 2101/32; C02F 2203/00; C02F 2101/10; C02F 2101/16; C02F 2101/163; C02F 2101/166; C02F 2101/105; C02F 2003/001; C02F 1/24; C02F 1/52; C02F 3/1268; C02F 3/28; C02F 2203/002; C02F 2209/40; C02F 3/307; Y02W 10/15
USPC ....... 210/605, 615, 616, 617, 623, 903, 906, 210/150, 151, 252, 259
See application file for complete search history.

(56) References Cited

U.S. PATENT DOCUMENTS 4,490,258 A * 12/1984 Heijnen .................. C02F 3/085
210/617
5,653,883 A * 8/1997 Newman ................. C02F 3/085
210/617

(Continued)

*Primary Examiner* — Fred Prince
(74) *Attorney, Agent, or Firm* — Walter Ottesen, P.A.

(57) ABSTRACT

Moving bed media serving as a growth surface for bacteria that remove soluble carbonaceous BOD, soluble inorganic ammonia nitrogen, phosphorous, nitrate nitrogen or nitrite nitrogen from wastewater are contained in a variable liquid depth, variable volume, hydraulic flow equalization basin. The equalization basin can be divided into different treatment sections by installing separator screens. Fat accumulation on the moving media, which could cause the media to float or in some other way cause the media to be ineffective, can be prevented by a fat, oil, and grease removal process in a dissolved air flotation cell upstream of the flow equalization basin containing the moving bed media. The moving bed media are retained in the basin by a suitable media screen as the liquid level and volume increases or decreases in the basin depending upon the effluent pumping rate vs. the influent flow rate.

23 Claims, 6 Drawing Sheets (51) Int. Cl.
*C02F 1/52* (2006.01)
*C02F 3/28* (2006.01)

(56) References Cited

U.S. PATENT DOCUMENTS

| | | |
|---|---|---|
| 8,753,512 B1 * | 6/2014 | Slajchert ............... C02F 3/2826 |
| | | 210/196 |
| 8,808,543 B2 | 8/2014 | Reid |
| 2006/0000768 A1 * | 1/2006 | Miklos .................... C02F 3/006 |
| | | 210/605 |
| 2006/0249448 A1 * | 11/2006 | Fujishima ............... C02F 3/121 |
| | | 210/602 |
| 2007/0187329 A1 * | 8/2007 | Moller .................... C02F 1/288 |
| | | 210/670 |
| 2013/0001159 A1 | 1/2013 | Reid |
| 2013/0319940 A1 | 12/2013 | Josse et al. |
| 2014/0144820 A1 * | 5/2014 | Early .................... C02F 3/1242 |
| | | 210/96.1 |
| 2014/0166574 A1 | 6/2014 | Fassbender |

\* cited by examiner

MOVING BED MEDIA FLOW EQUALIZATION REACTOR

FIELD OF THE DISCLOSURE

A variable liquid depth, variable volume, hydraulic flow equalization basin reactor or moving bed equalization reactor (MBER) is disclosed that contains moving bed media serving as a growth surface for bacteria that remove soluble carbonaceous BOD, total nitrogen, soluble inorganic ammonia nitrogen, phosphorus, nitrate nitrogen or nitrite nitrogen from wastewater or sewage. The moving bed media are suspended and mixed within the MBER by diffusing compressed air through air diffusers located at the bottom of the MBER tank for an aerobic process or by some other suitable mixing apparatus for an anoxic or anaerobic process.

BACKGROUND

Typically, the flowrate of wastewater or sewage flowing into a wastewater treatment facility varies widely depending on, for example, weather conditions, seasonal variations or the time of day. However, to improve the wastewater treatment process it is desirable to minimize the variations of the wastewater inflow rate into the treatment facility. For example, equalization basins can be employed to receive a wastewater inflow at a variable rate and to provide an outflow at a substantially constant rate, i.e., at an equalized outflow rate. US2013/0001159 teaches an equalized wastewater treatment process in which an equalization basin is not only used to equalize a wastewater inflow, but also to perform a first wastewater treatment process, such as an aerobic treatment or an anoxic treatment, in an equalization reactor at the head of a wastewater treatment plant.

Moving bed media for use in Moving Bed Bio-Reactors (MBBR) are typically hollow carriers made from polyethylene, polypropylene or similar materials that are placed into the MBBR. The carriers have usually a size of about one to several inches in diameter and offer a large inner surface area which allows a biofilm to attach and heterotroph or autotroph bacteria to grow. A large number of the hollow carriers is placed as the moving bed media into a fixed-volume MBBR and mixed under aeration to treat wastewater.

SUMMARY OF THE DISCLOSURE

Disclosed herein is a process and a system for operating a flow equalization reactor containing moving bed media for removing carbonaceous biological oxygen demand (BOD), total nitrogen, soluble inorganic ammonia nitrogen, phosphorus, nitrate nitrogen or nitrite nitrogen.

In particular, a process for treating industrial wastewater or municipal sewage is disclosed, which comprises providing a flow equalization reactor containing moving bed media; receiving an inflow of wastewater or sewage in the flow equalization reactor with a variable average flow rate; performing a bacterial wastewater treatment of the wastewater or the sewage within the flow equalization reactor; and providing an outflow from the flow equalization reactor at a substantially constant average flow rate.

Further, a flow equalization wastewater treatment system is disclosed, which comprises a flow equalization reactor, at least one separator wall being provided in the flow equalization reactor to define a plurality of wastewater treatment sections, the plurality of wastewater treatment sections containing moving bed media, and a media screen provided at an outflow of the flow equalization reactor.

BRIEF DESCRIPTION OF THE DRAWINGS

The disclosure will now be described with reference to the drawings wherein.

DESCRIPTION OF THE BEST AND VARIOUS EMBODIMENTS

The foregoing and other objects, aspects, and advantages of the disclosure will be better understood from the following detailed description of the best and various embodiments. Throughout the various views and illustrative embodiments of the present disclosure, like reference numbers are used to designate like elements.

In a typical embodiment, at least one separator screen is installed in the flow equalization reactor to define a plurality of treatment sections within the flow equalization reactor and at least a first bacterial wastewater treatment of wastewater or sewage is performed in a first treatment section and a second bacterial wastewater treatment is performed in a second treatment section. Plurality is defined in this disclosure to mean two or more of an item. Installing one separator screen therefore defines a plurality, in this case two, of treatment sections. In another typical embodiment, the outflow from the flow equalization reactor is conducted to a downstream dissolved air flotation (DAF) cell, a gravity clarifier, a membrane filtration system or an additional biological treatment reactor.

In a particular embodiment, a biomass recycle flow from the downstream DAF cell or the gravity clarifier is returned to the flow equalization reactor. In another particular embodiment, the outflow from the flow equalization reactor is conducted through a flocculation tube or a flocculation tank before the outflow from the flow equalization reactor is received in the DAF cell, the gravity clarifier or the membrane filtration system.

With particularity, a fats, oil, and grease (FOG) removal process of the wastewater or the sewage is performed before the wastewater or the sewage is received as an inflow in the flow equalization reactor. Also with particularity, the FOG removal process is performed in a DAF cell that is provided upstream of the flow equalization reactor.

In a typical embodiment, screenings and grit and, optionally, settleable suspended solids are removed from the sewage before the sewage is received as an inflow in the flow equalization reactor. In another typical embodiment, the screenings and grit are removed in a grit removal unit that is provided upstream of the flow equalization reactor. In yet another typical embodiment, the settleable suspended solids are removed in a primary clarifier that is provided upstream of the flow equalization reactor.

In a particular embodiment, the moving bed media maintains a bacteria population. In another particular embodiment, the bacteria population removes at least one of a biological oxygen demand (BOD), ammonia, nitrate nitrogen, nitrite nitrogen, and phosphorous from the wastewater or the sewage.

Typically, a moving bed media screen is provided at an outflow of the flow equalization reactor and at a recycle flow outlet or a recycle pump suction intake. Also typically, seed bacteria are injected into the flow equalization reactor.

In a particular embodiment, the wastewater or sewage and the moving bed media are agitated in the flow equalization reactor. In another particular embodiment, the wastewater or sewage and the moving bed media are agitated by diffusing compressed air through an air diffuser provided at a bottom of the flow equalization reactor.

With particularity, two separator screens are installed in a flow equalization reactor to define three treatment sections, whereby an anaerobic wastewater treatment is performed in the first treatment section while mixing the wastewater or sewage without oxygen transfer; an anoxic wastewater treatment is performed in the second treatment section while mixing the wastewater or sewage without oxygen transfer; and an aerobic wastewater treatment is performed in the third treatment section while mixing the wastewater or sewage with oxygen transfer.

Also with particularity, two separator screens are installed in an MBER reactor to define three treatment sections, whereby an anoxic denitrification wastewater treatment for removal of nitrite or nitrate nitrogen is performed in the first treatment section while mixing the wastewater or sewage without oxygen transfer; an aerobic nitritation wastewater treatment for the oxidation of ammonia to nitrite nitrogen is performed in the second treatment section while mixing the wastewater or sewage with oxygen transfer. Further, a bypass flow from the first treatment section is received in the third treatment section with a typical flow rate of from 40% to 50%, more typically 45%, of an average daily flow rate Q and an outflow from the second treatment section is received in the third treatment section with a typical flow rate of from 50% to 60%, more typically 55%, of the average daily flow rate Q. The bypass flow and the outflow are mixed in the third treatment section without oxygen transfer and a deammoniafication of ammonia to nitrogen gas as an anaerobic anammox wastewater treatment is performed in the third treatment section.

In a typical embodiment, two separator screens are provided within the flow equalization reactor to define three wastewater treatment sections. In another typical embodiment, a pipe is provided between two wastewater treatment sections or the separator screens have flow transition openings for conducting wastewater from an upstream wastewater treatment section to a downstream wastewater treatment section, and a pump is disposed to return wastewater and, optionally, media from a downstream wastewater treatment section to an upstream wastewater treatment section. In another typical embodiment, the pump is a screw pump which can provide a recycle flow by pumping media and wastewater without damaging the media. Typically, the flow transition openings in the separator walls are holes or slots.

In a particular embodiment, a dissolved air flotation cell, a gravity clarifier or a membrane filtration system are disposed to receive an outflow of wastewater from the flow equalization reactor. In another particular embodiment, a biomass recycle flow return line is provided for returning a biomass recycle flow from the gravity clarifier to the flow equalization reactor.

The process and the system herein uniquely use moving bed media to maintain a bacteria population in a variable liquid depth, variable volume, hydraulic flow equalization basin to achieve the required pollutant removal efficiency in a smaller reactor volume or to achieve significantly improved soluble BOD removal, and, optionally ammonia nitrogen, phosphorous, nitrate nitrogen or nitrite nitrogen removal within a given reactor volume. The flow equalization/moving bed media process is called the Moving Bed Equalization Reactor (MBER) treatment process in which an MBER reactor can be used upstream of a DAF cell as a pretreatment system, for example for certain industrial wastewater treatment applications. However, for example for municipal sewage treatment processes, a gravity clarifier is typically provided downstream of the MBER reactor.

By providing moving bed media in an MBER reactor, the treatment capacity and/or the pollutant removal efficiency of the equalization reactor can be increased relative to an equalization reactor, in particular when determined relative to the average volume within the reactors. The increase is even greater when determined relative to the minimum or residual volume within the MBER, i.e., when the liquid level is close to or at the low liquid level 210. Thus, a substantially constant, i.e., equalized outflow from the equalization reactor exceeding a current inflow can be provided without decreasing the treatment capacity. Accordingly, the MBER reactor allows to equalize the outflow even when the amount of wastewater or sewage within the reactor is decreasing without temporarily exceeding pollutant limits in the effluent.

Figure 1:
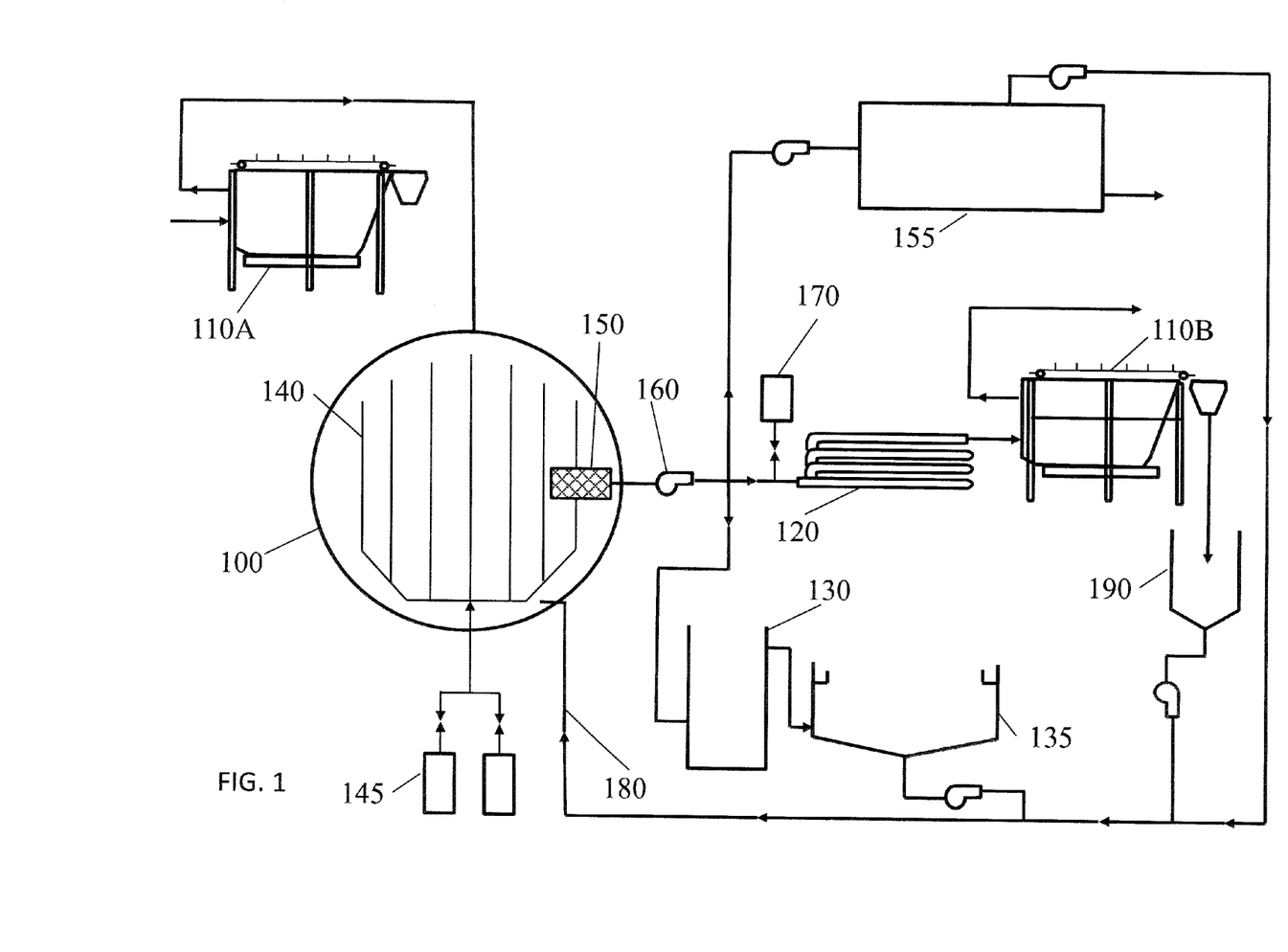
FIG. 1 shows an MBER reactor 100 that receives a wastewater inflow from a dissolved air flotation (DAF) cell 110A. An effluent is pumped out of the MBER reactor 100 using pump 160.

As shown in FIG. 1, wastewater flows in the direction of the arrow into upstream DAF cell 110A where FOG is removed to prevent fat accumulation on the moving bed media 200, which could cause the media to float or in some other way cause the media to be ineffective. However, providing a DAF cell upstream of the MBER 100 is optional. Subsequently, wastewater or sewage enters the MBER reactor 100, which contains the moving bed media 200. Typically, the inflow rate into the MBER reactor is variable over time, whereas the outflow from the MBER reactor is substantially constant. In this context, substantially constant means that the outflow rate typically does not vary more than ±20%, more typically not more than ±10% over 24 hours.

The moving bed media 200 are suspended and mixed within the MBER by diffusing compressed air through coarse bubble diffusers 140 located at the bottom of the MBER tank or by some other suitable mixing apparatus. Thus, the wastewater within the MBER reactor is not only mixed but also aerated. The mixing/aeration may be accomplished, for example, by using coarse bubble diffusers, fine bubble diffusers, jet pumps and jet aerators, floating surface aerators and/or floating surface mixers. The air for mixing and aerating is provided by air blowers 145.

The moving bed media 200 serve as a growth surface for bacteria that can be developed and controlled to remove soluble carbonaceous BOD or soluble inorganic ammonia nitrogen; or soluble inorganic nitrate or nitrite nitrogen; or, phosphorous.

Figure 2:
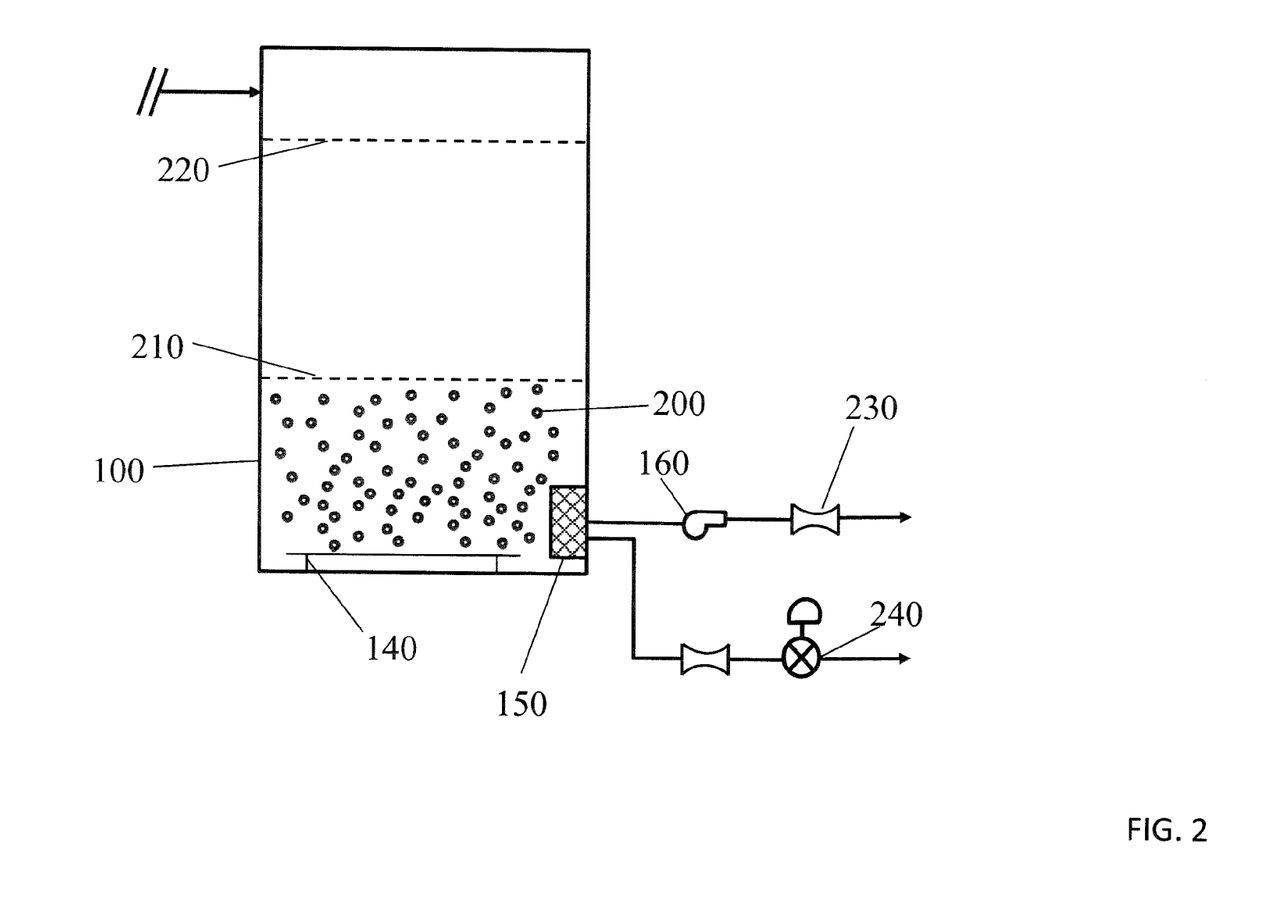
FIG. 2 shows a sideview of MBER reactor 100 containing moving bed media 200. The wastewater fill level within the reactor 100 is maintained between low level mark 210 and high level mark 220.

The moving bed media 200 are retained in the MBER 100 by a suitable media screen 150 as the wastewater liquid level and volume increase or decrease in the reactor depending upon the MBER effluent pumping or outflow rate vs. the MBER influent inflow rate. As shown in FIG. 2, the media screen 150 is located toward the bottom of the MBER reactor to ensure that an effluent can be provided even when the wastewater volume within the MBER reactor is at or near the low liquid level 210. Typically, the wastewater volume including the moving bed media is maintained between low liquid level 210 and high liquid level 220. In FIG. 2 the liquid level of the wastewater or sewage is at the low liquid level 210, such that the moving bed media are fully suspended within the entire volume occupied by the wastewater or sewage, i.e., the amount of media is selected such that the media are fully suspended even when the liquid level is at the low liquid level 210.

The moving bed media used is not particularly limited provided the media allows for the growth of the biofilm and support of the bacteria. Typically, the density of the moving bed media is chosen to roughly match the density of the wastewater or the sewage within the MBER reactor. As a result, the moving bed media have buoyancy within the wastewater or sewage but do not float on the surface or sink to the bottom. The agitation of the moving bed media ensures that wastewater that has undergone BOD or nitrogen removal treatment can be pumped out of the MBER reactor and that the moving bed media is available to treat freshly introduced wastewater.

FIG. 1 further shows pump 160, which ensures a constant outflow rate of effluent from MBER reactor 100. Typically, pump 160 is operated in combination with a flow meter. In a preferred embodiment, the effluent from MBER 100 is further treated in one of the three post-MBER treatment apparatuses depicted in FIG. 1, which are membrane filter station 155; flocculation tube 120 and downstream DAF cell 110B; or flocculation tank 130 and gravity clarifier 135. Thus, FIG. 1 shows three alternative means for treating the effluent from MBER reactor 100. For a given installation, only one of the three alternatives is typically chosen. In one embodiment, the partially treated wastewater from the MBER reactor is pumped through flocculation tube 120. Prior to entering or during the flow through the flocculation tube, a coagulant and/or a flocculant may be added from chemical reagent reservoir 170. Coagulants and/or flocculants assist in the solids/liquid separation of suspended particles of the wastewater in a DAF cell or gravity clarifying unit. For example, aluminum sulfate or ferric sulfate can be used as coagulants and polyacrylamides can be used as flocculants.

From flocculation tube 120 the partially treated wastewater enters DAF cell 110B where a floc is skimmed off. The treated wastewater, in turn, can be discharged at a discharge point, such as a river. The skimmings removed by DAF cell 110B can be collected in skimmings sludge collection tank 190 and recycled as a biomass return flow using recycle flow line 180.

In a preferred embodiment, the effluent from the MBER is conducted to flocculation tank 130 and, subsequently, to gravity clarifier 135. Settled solids from the gravity clarifier are recycled as a biomass recycle flow to the MBER via the recycle flow line 180. In another preferred embodiment, the effluent from MBER reactor 100 is conducted to membrane filter system 155, where the effluent is filtered before being discharged. Filtered solids from the membrane filter system 155 can be recycled as a biomass recycle flow to the MBER via the recycle flow line 180.

Additional process efficiency improvement can be achieved by injecting commercially purchased seed bacteria for BOD and ammonia removal into the DAF cell or gravity clarifier biomass recycle flow line 180 prior to entering the MBER tank. Further, the seed bacteria can also be dosed directly into the MBER reactor 100 or into one or more of the three treatment sections of MBER reactors 300, 400 or 500.

FIG. 2 shows a sideview of MBER reactor 100. The amount of moving bed media 200 is selected such that the media remains suspended even at low liquid level 210. Under these conditions, wastewater can flow between and into the individual carriers and reach the biofilm even when the wastewater is at the low liquid level 210. A rising liquid level decreases the concentration of media per volume unit but does not decrease the treatment capacity of the reactor. The moving bed media screen 150 allows at least partially treated wastewater or sewage to leave the MBER reactor while retaining the media within the reactor. The effluent from MBER reactor 100 can be pumped at a substantially constant flow rate with rate of flow control pump 160 in combination with flow meter 230. Alternatively, the effluent can be received from the MBER reactor at a substantially constant rate by gravity flow using a flow meter and a rate of flow control valve 240.

Utilizing the moving bed media within an equalization reactor allows to greatly increase the concentration of the bacteria within a given treatment volume while simultaneously performing a flow equalization. Thus, the desired BOD removal or soluble inorganic ammonium nitrogen removal or soluble inorganic nitrate or nitrite nitrogen removal, or phosphorous removal efficiency becomes less of a constraint on the overall design capabilities of the wastewater treatment system. It is typically sufficient to take into account the desired flow equalization capability when designing the wastewater treatment system as the increased concentration of bacteria provides for sufficient BOD or nitrogen removal efficiency.

Throughout this disclosure, wastewater is used as a term to describe industrial wastewater that is generated by an industrial producer, for example a meat processing plant. Sewage is used as a term to describe municipal sewage that is generated predominantly in human dwellings. Typically, the treatment process and treatment system herein are adapted for treating either industrial wastewater or municipal sewage. Nevertheless, the disclosed treatment process and treatment system are also suitable for treating mixtures of wastewater and sewage. Moreover, the use of a particular embodiment adapted for wastewater treatment in the treatment of sewage and vice versa is not precluded.

Figure 3:
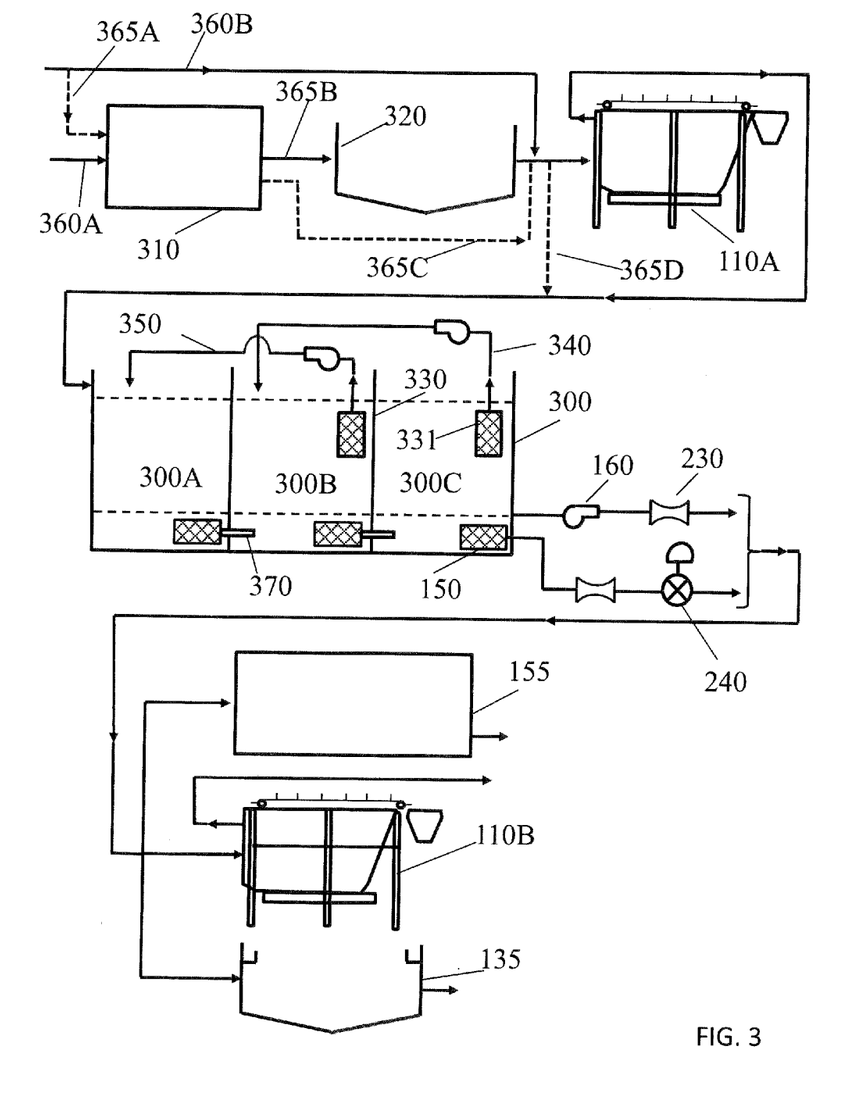
FIG. 3 shows a sideview of MBER reactor 300 along with upstream grit removal unit 310, primary clarifier 320 and DAF cell 110A as pre-treatment options for MBER reactor 300.

FIG. 3 shows MBER reactor 300 which includes two separator partitions 330 for defining three treatment sections 300A, 300B, and 300C. The media screens 331 allow liquid to flow in and out of a treatment section but prevent the moving bed media from leaving the treatment section. MBER reactor 300 may be used to treat an influent of municipal sewage 360A or industrial wastewater 360B. Commonly, the influent undergoes at least one pre-treatment process, such as a screening and grit removal in grit removal unit 310 and/or removal of suspended solids in primary clarifier 320 and/or FOG removal in upstream DAF cell 110A. Typically, wastewater is treated in upstream DAF cell 110A and then provided as an influent to MBER 300. However, wastewater may optionally also undergo a screening and grit removal in grit removal unit 310 as indicated by dashed arrow 365A before entering DAF cell 110A, as indicated by dashed arrow 365C. Thus, it is less common, but not precluded, to treat wastewater in grit removal unit 310, as indicated by dashed arrow 365A, prior to the FOG removal in DAF cell 110A, as indicated by dashed arrow 365C.

Sewage 360A typically undergoes screening and grit removal in grit removal unit 310. Subsequently, sewage is either treated in clarifier 320, as indicated by arrow 365B, and then provided as an influent into MBER 300, as indicated by arrow 365D, before being provided as an influent into MBER 300. Thus, wastewater is typically pre-treated in an upstream DAF cell and sewage is typically pre-treated in a grit removal unit and subsequently in a primary clarifier.

The individual treatment sections of MBER 300 are supplied with different bacteria and, optionally, with different types of media to allow for different wastewater treatment processes within the individual sections. For example, section 300A may contain bacteria for anaerobic treatment, section 300B for anoxic treatment, and section 300C for aerobic treatment. Further, nitrate/nitrite recycle flow line 340 is provided leading from section 300C to section 300B and anoxic recycle flow line 350 is provided leading from section 300B to section 300A. The flow lines 340 and 350 include flow pumps which are equipped with media screens 331 at the respective pump suction intake ports.

Figure 7:
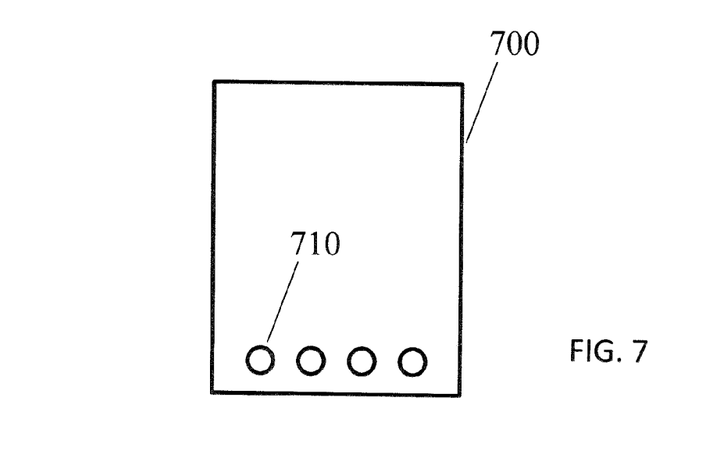
FIG. 7 shows a separator screen 700 having flow holes 710 that allow passage of media; and, FIG. 8 shows MBER reactor 800 including nitrite recycle line 830 and return activated sludge line 840.

The wastewater or sewage is maintained within the individual wastewater treatment sections by separator screens 330 to allow for the particular wastewater treatment process to take place within a given volume of liquid before that volume can flow to the next treatment section. The liquid can either flow through an internal or external pipe 370 or through flow openings, i.e., through holes 710 provided in the separator screens. The flow of wastewater or sewage from an upstream to a downstream treatment section may be such that the media is retained in the upstream treatment section, which can be accomplished by providing a media screen 150 in front of the pipe or the flow opening.

After equalizing and treating the wastewater or sewage in MBER reactor 300, the effluent in MBER reactor 300 is either pumped at a substantially constant flow rate with rate of flow control pump 160 in combination with flow meter 230 or the effluent flows at a substantially constant rate by gravity flow using a flow meter and a rate of flow control valve 240.

Subsequently, the effluent is optionally treated in either membrane filtration unit 155, downstream DAF cell 110B or gravity clarifier 135 before being discharged.

Figure 4:
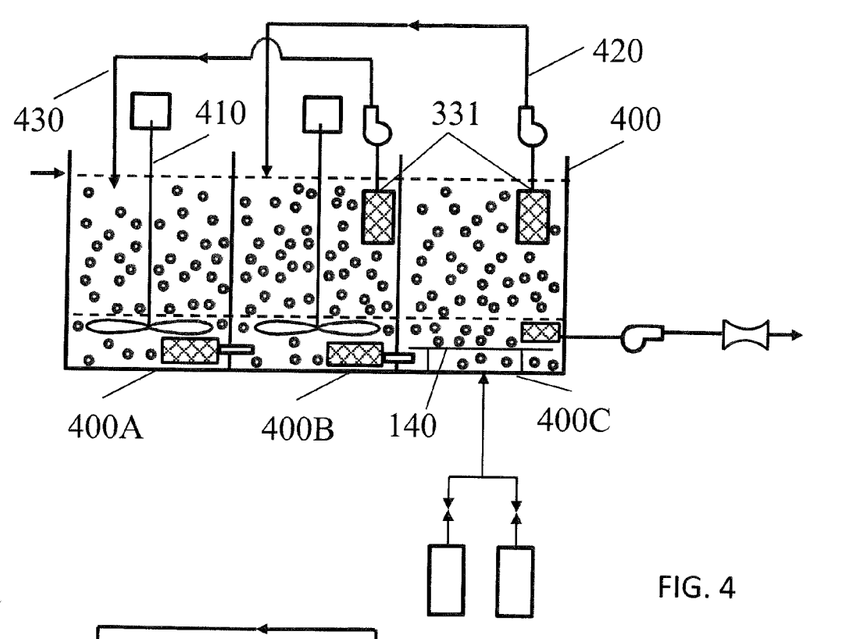
FIG. 4 shows MBER reactor 400 having two separator screens 330 for defining treatment sections 400A, 400B, and 400C.
Figure 5:
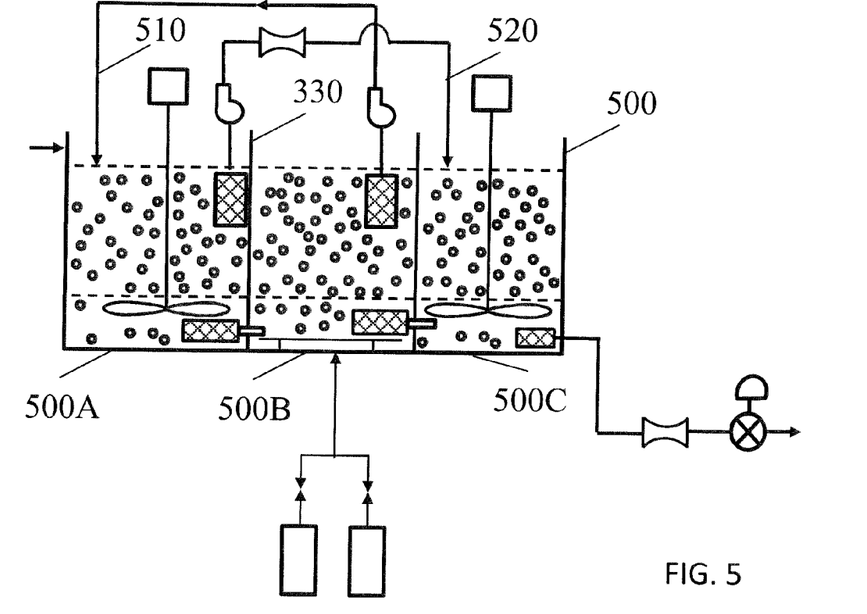
FIG. 5 shows MBER reactor 500 with three different treatment sections 500A, 500B, and 500C, respectively, a flow meter, and a gravity flow rate control valve and a flow meter.

FIGS. 4 and 5 show two exemplary embodiments in which different treatment processes take place in separate treatment sections within an MBER reactor to provide efficient pollutant removal at high throughput capacities.

In FIG. 4, two mixers 410 are installed in treatment sections 400A and 400B, respectively, to agitate the media and the wastewater or sewage within the MBER reactor 400. The mixers agitate the liquid without causing oxygen transfer. Section 400C contains air diffusers 140 located at the bottom of the reactor for mixing with oxygen transfer. Wastewater or sewage sequentially undergoes anaerobic treatment, anoxic treatment, and aerobic treatment within MBER reactor 400. Further, nitrate/nitrite recycle flow line 420 is provided leading from section 400C to section 400B and anoxic recycle flow line 430 is provided leading from section 400B to section 400A. Treated effluent is pumped from MBER reactor 400 at a substantially constant flow rate with rate of flow control pump 160 in combination with flow meter 230. Typically, the effluent is further treated in a clarifying process, for example in a secondary clarifier (not shown).

In FIG. 5, two mixers 410 are installed in treatment sections 500A and 500C, respectively, to agitate the media and the wastewater or sewage within the MBER reactor 500. The mixers agitate the liquid without causing oxygen transfer. Section 500B contains air diffusers located at the bottom of the reactor for mixing wastewater or sewage with oxygen transfer. In the exemplary embodiment of FIG. 5, wastewater or sewage sequentially undergoes anoxic denitrification, aerobic nitritation, and anaerobic anammox deammonification treatment within MBER reactor 500. Treated effluent leaves MBER reactor 500 at a substantially constant flow rate by gravity flow using a flow meter and a rate of flow control valve 240 for further treatment or discharge. Nitrite/nitrate recycle flow line 510 provides a return flow of effluent from the second treatment section to the first treatment section. Further, bypass flow line 520 is provided for conducting an effluent directly from the first treatment section into the third treatment section. Typically, approximately 45% of throughput flow by-passes the second treatment section and is conducted directly into the third treatment section.

Figure 6:
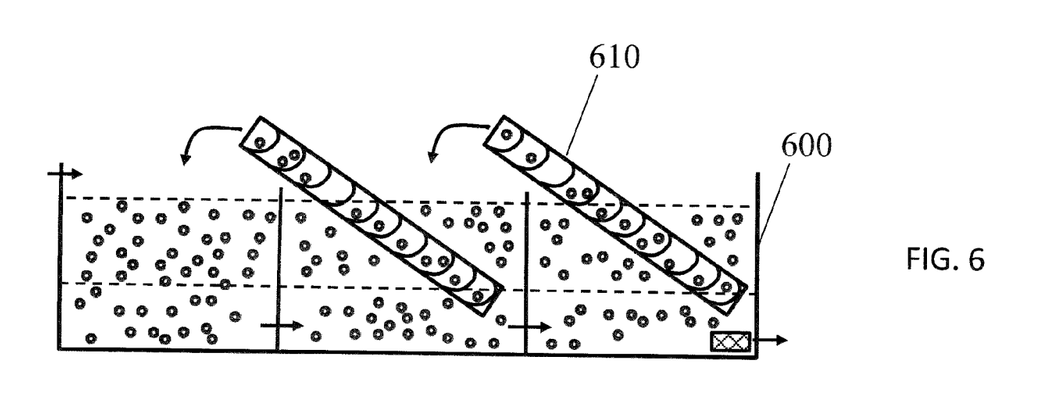
FIG. 6 shows MBER reactor 600 including two screw or auger-type pumps 610 for returning media to an upstream treatment section.

FIG. 6 shows a flow equalization reactor 600 in which at least some of the media flows with the wastewater or sewage effluent from an upstream treatment section to a downstream treatment section. To avoid depletion of the moving bed media as the reactor contents leave a treatment section with the effluent, screw pumps 610 are provided to return the media to an upstream treatment section without damaging the media.

FIG. 7 shows separator screen 700 having flow openings that when installed are located below the low liquid level 210 to allow wastewater or sewage to flow to a downstream treatment section. The flow holes 710 shown in the separator screen have a circular shape, but other shapes, such as square or rectangular may also be provided. The flow holes may allow a small amount of some media to enter the downstream treatment section with the wastewater or sewage. Optionally, a media screen can be provided in front of a flow hole 710 to retain the media in the upstream treatment section.

Figure 8:
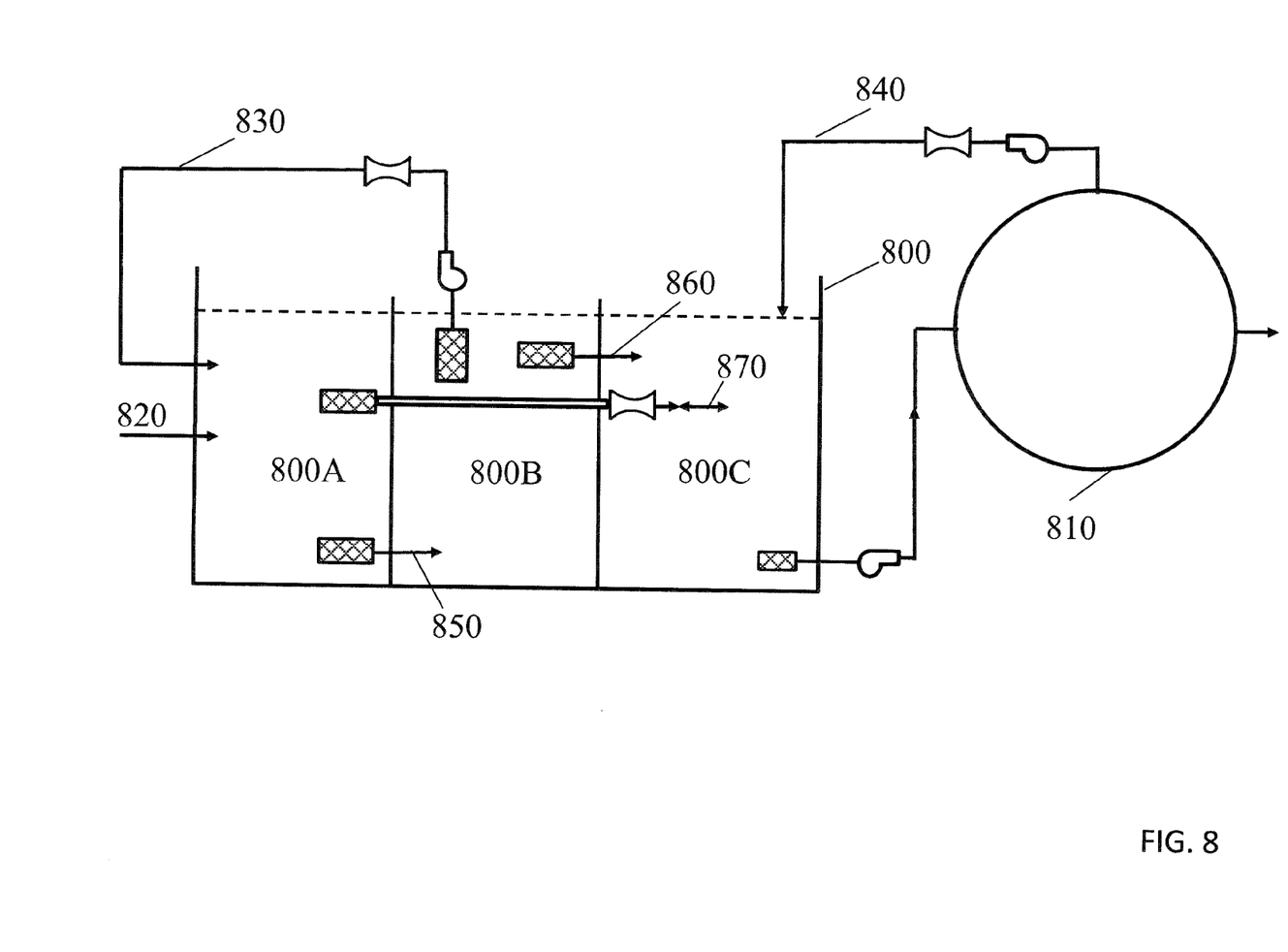

FIG. 8 shows MBER reactor 800, which is divided into three wastewater or sewage treatment sections by two separator screens. The entire inner volume of the MBER reactor is used to equalize incoming wastewater or sewage flow 820 having an average daily flow rate Q and to simultaneously perform three different bacterial wastewater or sewage treatments. Specifically, the first equalized treatment section 800A is operated as a denitrification reactor, the second equalized treatment section 800B is operated as a nitritation reactor, and the third equalized treatment section 800C is operated as an anammox reactor. An outflow of the MBER reactor is pumped into final gravity clarifier 810. However, instead of a gravity clarifier, the outflow may also be pumped to a DAF cell, a lamella clarifier, a Tequatic™ filter, or a membrane filter.

A return activated sludge line 840 is provided for returning effluent from the gravity clarifier 810 to the third treatment section, or anammox reactor, 800C with a rate of 0.1 Q to 1.0 Q. The third partition 800C further receives an inflow 860 from the nitritation reactor 800B with a flow rate that is typically in the range of from 0.5 to 0.6 Q, more typically 0.55 Q, and a bypass inflow 870 from the denitrification reactor 800A with a flow rate that is typically in the range of from 0.4 to 0.5 Q, more typically 0.45 Q. Moreover, the nitritation reactor 800B receives an inflow 850 from the denitrification reactor 800A with a flow rate of typically 0.55 to 4.55 Q, while a nitrite recycle flow 830 with a typical flow rate of from 0 to 4 Q is pumped from the second treatment section 800B to the first treatment section 800A.

The embodiments described hereinabove are further intended to explain best modes known of practicing it and to enable others skilled in the art to utilize the disclosure in such, or other, embodiments and with the various modifications required by the particular applications or uses. Accordingly, the description is not intended to limit it to the form disclosed herein. Also, it is intended that the appended claims be construed to include alternative embodiments.

The foregoing description of the disclosure illustrates and describes the present disclosure. Additionally, the disclosure shows and describes only the preferred embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purpose, as if each individual publication, patent or patent application were specifically and individually indicated to be incorporated by reference. In the case of inconsistencies, the present disclosure will prevail.

What is claimed is:

1. A process for treating industrial wastewater or municipal sewage, comprising:
    providing a flow equalization reactor containing moving bed media;
    receiving an inflow of wastewater or sewage in the flow equalization reactor with a variable average flow rate;
    performing a bacterial wastewater treatment of the wastewater or the sewage within the flow equalization reactor;
    providing an outflow from the flow equalization reactor at a substantially constant average flow rate;
    providing at least one separator screen in the flow equalization reactor to define a plurality of treatment sections within the flow equalization reactor; and,
    performing at least a first bacterial wastewater treatment of the wastewater or the sewage in a first treatment section and a second bacterial wastewater treatment in a second treatment section.

2. The process according to claim 1, further comprising:
    conducting the outflow from the flow equalization reactor to a downstream dissolved air flotation (DAF) cell, a gravity clarifier, a membrane filtration system or an additional biological treatment reactor.

3. The process according to claim 2, further comprising:
    providing a biomass recycle flow from the downstream DAF cell or the gravity clarifier to the flow equalization reactor.

4. The process according to claim 2, further comprising:
    conducting the outflow from the flow equalization reactor through a flocculation tube or a flocculation tank before the outflow from the flow equalization reactor is received in the DAF cell, the gravity clarifier or the membrane filtration system.

5. The process according to claim 1, further comprising:
    performing a fats, oil, and grease (FOG) removal process of the wastewater or the sewage before the wastewater or the sewage is received as an inflow in the flow equalization reactor.

6. The process according to claim 5, wherein the FOG removal process is performed in an upstream DAF cell being provided upstream of the flow equalization reactor.

7. The process according to claim 1, further comprising:
    removing screenings and grit and, optionally, settleable suspended solids from the sewage before the sewage is received as an inflow in the flow equalization reactor.

8. The process according to claim 7, wherein the screenings and grit are removed in a grit removal unit being provided upstream of the flow equalization reactor.

9. The process according to claim 7, wherein the settleable suspended solids are removed in a primary clarifier being provided upstream of the flow equalization reactor.

10. The process according to claim 1, wherein the moving bed media maintains a bacteria population.

11. The process according to claim 10, wherein the bacteria population removes at least one of a biological oxygen demand (BOD), ammonia, nitrate nitrogen, nitrite nitrogen, and phosphorous from the wastewater or the sewage.

12. The process according to claim 1, further comprising:
    providing a moving bed media screen at an outflow of the flow equalization reactor, at a recycle flow outlet or at a recycle pump suction intake.

13. The process according to claim 1, further comprising:
    injecting seed bacteria into the flow equalization reactor.

14. The process according to claim 1, further comprising:
    agitating the wastewater or sewage and the moving bed media in the flow equalization reactor.

15. The process according to claim 14, wherein the wastewater or sewage and the moving bed media are agitated by diffusing compressed air through an air diffuser provided at a bottom of the flow equalization reactor.

16. The process according to claim 1, further comprising:
    providing two separator screens to define three treatment sections;
    performing an anaerobic wastewater treatment in the first treatment section and mixing the wastewater or sewage without oxygen transfer;
    performing an anoxic wastewater treatment in the second treatment section and mixing the wastewater or sewage without oxygen transfer; and,
    performing an aerobic wastewater treatment in the third treatment section and mixing the wastewater or sewage with oxygen transfer.

17. The process according to claim 1, further comprising:
    providing two separator screens to define three treatment sections;
    performing an anoxic denitrification wastewater treatment for removal of nitrite or nitrate nitrogen in the first treatment section and mixing the wastewater or sewage without oxygen transfer;
    performing an aerobic nitritation wastewater treatment for oxidation of ammonia to nitrite nitrogen in the second treatment section and mixing the wastewater or sewage with oxygen transfer;
    receiving a bypass flow from the first treatment section in the third treatment section with a flow rate of from 40% to 50% of an average daily flow rate Q and an outflow from the second treatment section in the third treatment section with a flow rate of from 50% to 60% of the average daily flow rate Q;

mixing the bypass flow and the outflow in the third treatment section; and, performing an anaerobic anammox wastewater treatment deammoniafication of ammonia to nitrogen gas in the third treatment section.

18. A flow equalization wastewater treatment system comprising:

a flow equalization reactor;

at least one separator screen being provided in the flow equalization reactor to define a plurality of wastewater treatment sections;

the plurality of wastewater treatment sections containing moving bed media; and, a media screen provided at an outflow of the flow equalization reactor.

19. The flow equalization wastewater treatment system according to claim 18 wherein two separator screens are provided to define three wastewater treatment sections, the system further comprising:

a pipe being provided between two wastewater treatment sections or the separator screens having flow transition openings for conducting wastewater from an upstream wastewater treatment section to a downstream wastewater treatment section; and, a pump being disposed to return wastewater and, optionally, media from a downstream wastewater treatment section to an upstream wastewater treatment section.

20. The flow equalization wastewater treatment system according to claim 19 wherein the pump is a screw pump.

21. The flow equalization wastewater treatment system according to claim 19 wherein the flow transition openings in the separator screens are flow holes.

22. The flow equalization wastewater treatment system according to claim 18, further comprising:

a dissolved air flotation (DAF) cell, a gravity clarifier or a membrane filtration system being disposed to receive an outflow of wastewater from the flow equalization reactor.

23. The flow equalization wastewater treatment system according to claim 22, further comprising:

a biomass recycle flow return line for returning a biomass recycle flow from the gravity clarifier to the flow equalization reactor.

* * * * *